United States Patent [19]

Simola et al.

[11] Patent Number: 4,634,521
[45] Date of Patent: Jan. 6, 1987

[54] SCREENING APPARATUS WITH LIGHT REJECT REMOVAL

[75] Inventors: Markku A. Simola, Karhula; Vesa Haapoja, Pietarsaari, both of Finland

[73] Assignees: Ahlström Corp; Oy Wilh.Schauman AB, both of Helsinki, Finland

[21] Appl. No.: 732,158

[22] PCT Filed: Oct. 11, 1984

[86] PCT No.: PCT/FI84/00074
§ 371 Date: Apr. 30, 1985
§ 102(e) Date: Apr. 30, 1985

[87] PCT Pub. No.: WO85/01967
PCT Pub. Date: May 9, 1985

[30] Foreign Application Priority Data
Oct. 25, 1983 [FI] Finland .................................. 833895

[51] Int. Cl.⁴ .............................................. B07B 1/20
[52] U.S. Cl. ..................................... 209/17; 209/250;
209/273; 209/306; 209/211; 162/251; 210/413;
210/415; 210/512.3

[58] Field of Search .................... 209/250, 273, 17, 13,
209/306, 211, 500, 501; 162/55, 251; 210/294,
295, 413, 414, 415, 512.3

[56] References Cited
U.S. PATENT DOCUMENTS

| | | | |
|---|---|---|---|
| 2,510,781 | 6/1950 | Howard | 209/211 X |
| 3,363,759 | 1/1968 | Clark-Powder | 209/306 X |
| 3,726,401 | 4/1973 | Bolton | 209/273 X |
| 3,912,622 | 9/1975 | Bolton | 209/273 X |
| 4,268,381 | 5/1981 | Hooper | 209/273 |

Primary Examiner—S. Leon Bashore
Assistant Examiner—Thomas M. Lithgow
Attorney, Agent, or Firm—Bucknam and Archer

[57] ABSTRACT

A screen for fibre pulp is provided with means for removal of light reject. The screening apparatus comprises a vertical cylindrical screen (2); and a rotor (3) which is concentrically disposed inside the screen and the substantially closed outer surface (9) of which together with the inner surface (10) of the screen defines a screening zone (11) for the pulp. A pipe (19) is provided inside the rotor (3) the upper end of the pipe being disposed adjacent to the inner surface (21) of the closed upper end (12) of the rotor (3).

5 Claims, 2 Drawing Figures

SCREENING APPARATUS WITH LIGHT REJECT REMOVAL

TECHNICAL FIELD

The present invention relates to a screening apparatus for separating solid particles, such as fibre bundles used in paper making, and light particles from slurries, the apparatus comprising a vertical cylindrical screen; a rotor which is concentrically disposed inside the screen and the substantially closed outer surface of which together with the interior surface of the screen defines a screening zone for the pulp; an accept chamber surrounded by the outer surface of the screen; an inlet for supplying the pulp to be screened into the upper end of the screening zone; a reject chamber connected to the lower end the screening zone; and means for separating the heavy and the light impurities from each other.

BACKGROUND ART

When screening paper pulps containing a variety of impurities in a screen described e.g. in U.S. Pat. No. 3,363,759, the reject contains also particles which can be separated from it by employing centrifugal force. The particles separated in this way, the specific gravity of which is lower than that of the average particles, i.e. the light reject, contains e.g. various plastics. The remaining reject contains e.g. fibre bundles and pieces of knots. It is an object of the present invention to provide a screen which in a simple manner separates light impurities from the reject flow.

DISCLOSURE OF THE INVENTION

The screen to which the present invention relates has been developed from a known screen disclosed e.g. in U.S. Pat. No. 3,363,759. Another version of the screen of the patent has later been modified for removal of plastics, this apparatus in turn being disclosed in U.S. Pat. No. 3,912,622. In this version the separation of the light particles from the rejected pulp is arranged through a pipe one end of which is fixed to the inlet end of the screen and the other end extended through an opening in the cover of the casing. A conical extension is provided in the other end of the pipe which extends to the open upper end of the rotor. Due to the vortex movement of the rejected pulp the light reject concentrated in the inner part of the vortex flows out through a discharge pipe while the heavier reject gathered in the outer part is recirculated into the screening zone. In order to achieve efficient separation the reject flow must be ample, a fact which decreases the capacity of the machine.

It is an object of the present invention to provide a device simple in construction for separating light reject from the reject flow. This is achieved by arranging a pipe inside the rotor to remove the light reject, the upper end of the pipe being disposed adjacent to the inner surface of the closed upper end of the rotor. The invention provides a simple way of adding into existing screens a system for removing light reject.

BRIEF DESCRIPTION OF THE DRAWINGS

The apparatus according to the invention is illustrated by the accompanying drawings which are described in detail below.

BEST MODE OF CARRYING OUT THE INVENTION

Figure 1:
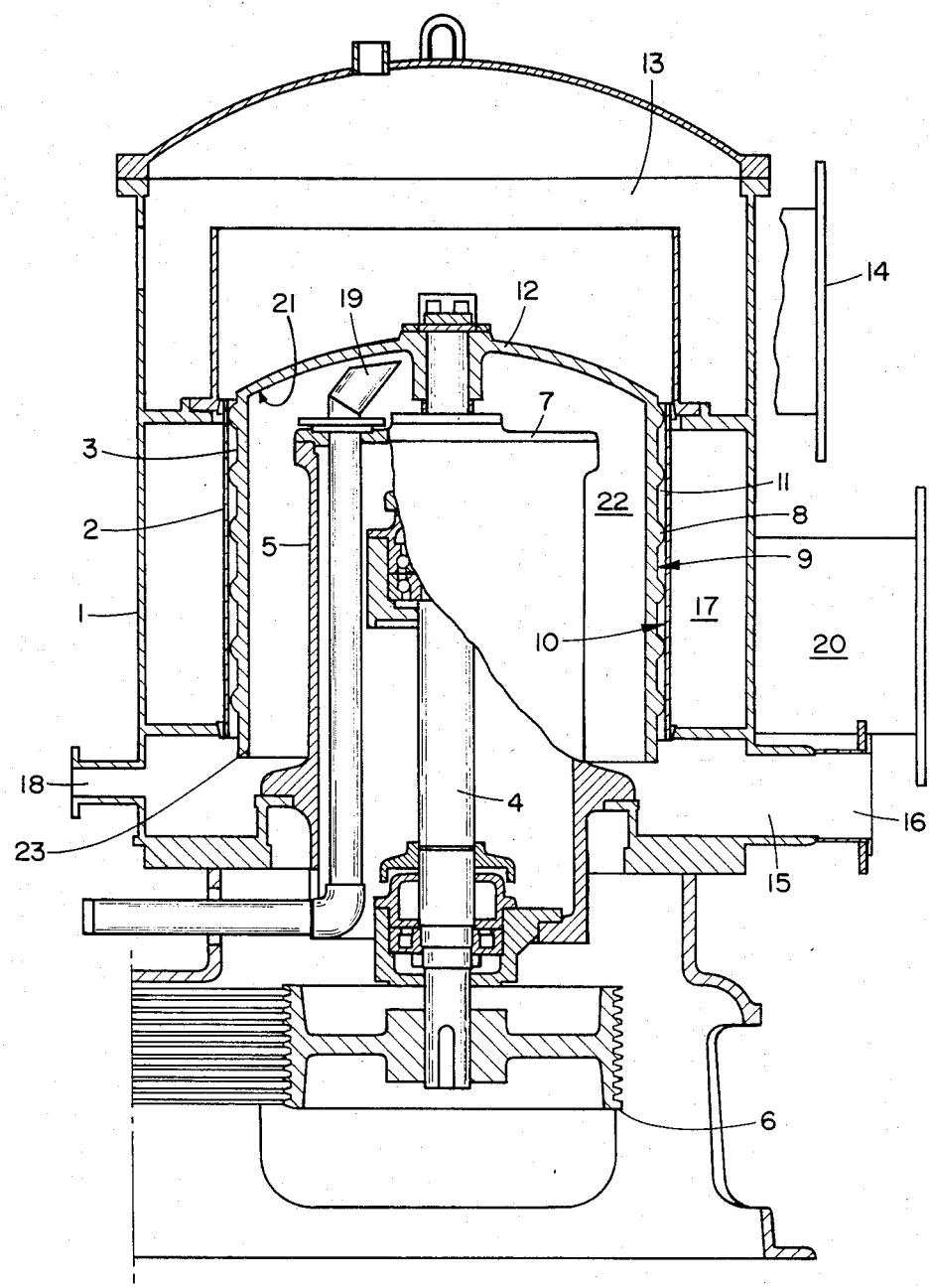
FIG. 1 is a vertical section of an embodiment of the invention.

The main parts of the screen illustrated in FIG. 1 are a multi-compartment housing 1, a screen drum 2, a rotor 3 and a shaft 4. The shaft is rotatably mounted inside the rotor on bearings on a cylindrical support 5 which is fixed to the housing by a sealing joint. The rotor is mounted on the upper end of the shaft and a belt pulley 6 on the lower end of the shaft for rotating the rotor. A disc 7 is fixed to the upper end of the support through which the shaft extends. The rotor outer surface 9 provided with half-spherical protrusions 8 and the inner surface 10 of the concentric screen drum defines a ring-shaped screening zone 11 where the pulp to be screened is fed into. The upper end of the rotor is closed by an end plate 12 into which the shaft is fixed.

The upper part of the housing constitutes of a feed chamber 13 provided with an inlet 4 for the pulp to be screened. There is a reject chamber 15 provided with a discharge orifice 16 in the lower part of the housing. The upper end of the screening zone 11 is connected to the feed chamber and the lower end to the reject chamber. There is an accept chamber 17 outside the screen drum.

An inlet 18 for dilution water is arranged in the reject chamber. A discharge pipe 19, which extends through the support and the disc 7 in the upper end of the support, is disposed inside the support; the upper end of the pipe is disposed adjacent to the inner surface 21 of the rotor end plate 12.

The pulp to be screened is supplied into the device through the inlet 14 and at first it circulates in the feed chamber tangentially. The feed chamber acts at the same time as a scrap catcher, where stones and other heavy pieces are removed. From the feed chamber the pulp flows into the slot 11 between the rotor 3 and the screen drum 2 which functions as a screening zone. The accept flows from the screening zone 11 through the screen surface 10 to the accept chamber 17. From the accept chamber the pulp is discharged through a discharge pipe 20.

The reject, i.e the portion of the pulp flow which does not pass through the screen surface, ends up in the reject chamber 15. In the reject chamber the reject is diluted by dilution water supplied through the opening 18 and is discharged through the discharge opening 16.

Several mill scale test have shown that e.g. the plastics, which is a typical constituent in the light reject, remains on the reject side. E.g. by employing a 0.45 mm slot screen as the screening surface, 85 to 95% of the plastics in a typical sulphate cellulose pulp can be removed, which yields accept with a plastics content of 5 to 15%, only, of the plastics content of the feed flow. The only problem that remains is how to separate the plastics and other light particles from the reject flow.

An apparatus according to the invention solves this problem. In the apparatus the light reject is gathered inside the rotor 3 in the space under the top cover 12 from which it can be removed through pipe 19 either continuously or intermittently.

The light reject flows into a space 22 inside the rotor through the rotor bottom end 23. The high revolution speed, which is typical of the rotor, brings the pulp in the screening space, in the reject chamber and in the space 22 inside the rotor into a rotating motion which creates the centrifugal field necessary for the separation of the light reject. Dilution water may be supplied into the reject chamber in order to regulate the consistency.

Figure 2:
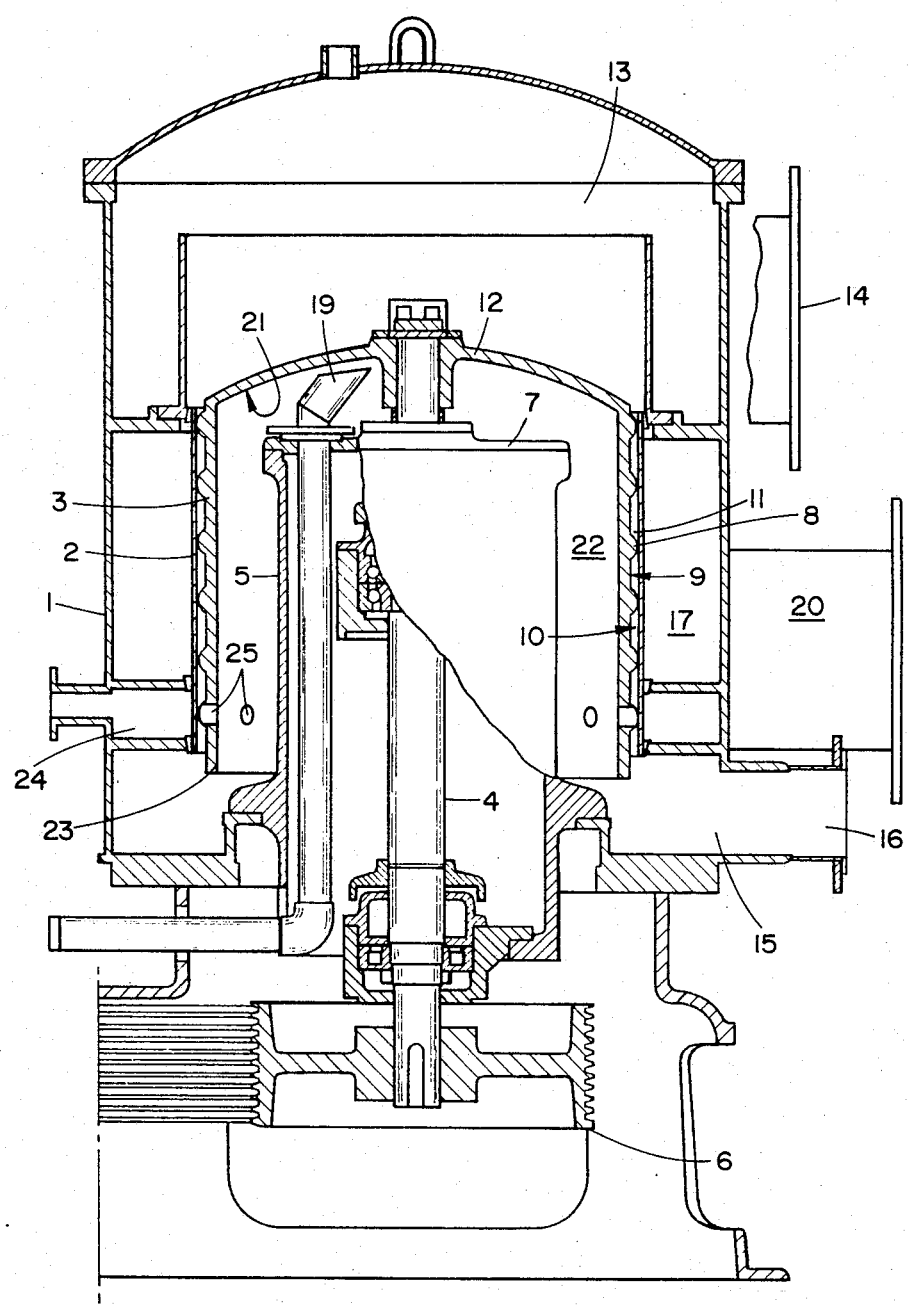
FIG. 2 is a part of another embodiment of the invention.

FIG. 2 illustrates an alternative embodiment of the invention. The pulp is diluted at the bottom end of the screening zone 11 by liquid supplied through the dilution water ring 24. There are openings 25 in the rotor through which the main portion of the reject flow is supplied into the space 21 inside the rotor where the light reject is separated by centrifugal force. The light reject flows up into the space under the rotor top end 12 from which it is removed through pipe 19 and the remaining reject flows down into the reject chamber 15 from which it is discharged through the opening 16.

A screen according to the present invention facilitates efficient separation of light reject such as plastics although the reject flow is maintained small in relation to the feed flow.

The invention is not limited to the embodiments presented and described as examples, only, but several modifications may be made of it within the scope of protection defined by the claims.

We claim:

1. A screening apparatus for separating the accept from the reject and separating impurities of specific gravity lower than the average particles of the impurities in the reject, from the heavy reject, which comprises a vertical cylindrical screen (2); a rotor (3) concentrically disposed within the screen, said rotor having an outer surface (9) and a closed upper end (12), said upper end having an inner surface (21), said closed upper end and said outer surface defining a space (22) within the rotor, means to rotate the rotor, said screen having an inner surface (10), said outer surface (9) of the rotor and said inner surface of the screen defining a screening zone (11), an acceptor chamber (17) surrounding the outer surface of the screen; an inlet (14) for supplying the pulp to be screened into a feed chamber at the upper end of the screening zone; a reject chamber (15) connected to the lower end of the screening zone; and means for separating the heavy reject from the impurities of lower specific gravity from each other, which comprises a pipe (19) disposed within the rotor, the upper end of the pipe being located adjacent said inner surface (21) of said closed upper end (12) of the rotor, said reject collecting in the reject chamber.

2. A screen as recited in claim 1 wherein the pipe (19) is arranged to extend through a bearing support (5) disposed inside the rotor.

3. A screen as recited in claim 1 comprising means (24) for admitting dilution liquid into the screening zone (11).

4. A screen as recited in claim 3 wherein the rotor is provided with apertures (25) for admitting diluted reject into a space (22) inside the rotor.

5. The screen according to claim 1 comprising means for admitting dilution liquid into said reject chamber.

* * * * *